United States Patent [19]

Post et al.

[11] Patent Number: 4,924,400
[45] Date of Patent: May 8, 1990

[54] ARRANGEMENT FOR CONTROLLING THE PERFORMANCE OF BOB-UP/BOB-DOWN MANEUVERS BY A HELICOPTER

[75] Inventors: Joseph A. Post, Huntington; Lorren Stiles, Boxbury, both of Conn.

[73] Assignee: United Technologies Corporation, Hartford, Conn.

[21] Appl. No.: 239,475

[22] Filed: Sep. 1, 1988

[51] Int. Cl.$^5$ .................. G06F 15/50; B64C 19/00
[52] U.S. Cl. .................. 364/433; 244/17.13
[58] Field of Search .................. 364/433, 427; 244/17.11, 17.13, 17.15, 180

[56] References Cited

U.S. PATENT DOCUMENTS

| | | | |
|---|---|---|---|
| 3,743,221 | 7/1973 | Lykken et al. | 244/180 |
| 4,004,756 | 1/1977 | Gerstine et al. | 244/17.13 |
| 4,029,271 | 6/1977 | Murphy et al. | 244/17.13 |
| 4,114,842 | 9/1978 | Hofferber et al. | 277/180 |
| 4,293,840 | 10/1981 | Hadari | 364/433 |
| 4,330,829 | 5/1982 | Fischer et al. | 364/434 |
| 4,603,388 | 7/1986 | Griffith et al. | 364/433 |
| 4,609,988 | 9/1986 | Zweifel | 364/433 |
| 4,642,774 | 2/1987 | Centala et al. | 364/434 |
| 4,645,141 | 2/1987 | McElreath | 244/17.13 |
| 4,801,110 | 1/1989 | Skutecki | 244/17.13 |
| 4,945,590 | 3/1976 | Kennedy, Jr. et al. | 244/181 |

Primary Examiner—Thomas G. Black
Attorney, Agent, or Firm—Peter R. Ruzek

[57] ABSTRACT

A control arrangement for use in conjunction with a flight control computer operating in response to various input signals including those received from a collective stick to control the flight regime of a helicopter, which is operative for causing the helicopter to perform bob-up and bob-down maneuvers, includes a circuitry which generates a first control signal when the helicopter is to perform a bob-up maneuver from its instantaneous altitude to a higher altitude, stores data descriptive of at least one instantaneous altitude at the time of commencement of the first control signal; issues in response to the first control signal, an ascent command signal representative of a helicopter ascent at a maximum permissible ascent rate; generates a second control signal when the helicopter is to perform a bob-down maneuver from the higher altitude to that stored in the storing means; issues, in response to the second control signal, a descent command signal representative of a helicopter descent at a maximum permissible descent rate; and supplies the respective one of the ascent and descent command signals as an additional input signal to the flight control computer for use in controlling the flight regime of the helicopter in accordance therewith.

6 Claims, 6 Drawing Sheets

ARRANGEMENT FOR CONTROLLING THE PERFORMANCE OF BOB-UP/BOB-DOWN MANEUVERS BY A HELICOPTER

TECHNICAL FIELD

The present invention relates to aircraft control systems in general, and more particularly to helicopter flight control systems.

BACKGROUND ART

There are already known various constructions of aircraft flight control systems, among them such in which the flight regime of an aircraft, such as a helicopter, is controlled by a flight control computer in response to various inputs, including those representing pilot commands resulting, for instance, from manipulation of a collective stick, a switch or the like by a pilot. Examples of control systems of this type can be found, for instance, in U.S. Pat. Nos. 3,743,221, 3,945,590, 4,114,842, 4,642,774 and 4,765,141, to which reference may be had for details of the construction and operation of aircraft equipped with such flight control computers and the manner in which such control systems of this kind are modified to respond to various types of contingencies or to perform desired aircraft maneuvers.

Operating a helicopter is a very demanding activity for the pilot, especially when the helicopter is to be used in military operations where the pilot, besides attending to routine flight control tasks, has to devote his attention to a multitude of other tasks, such as evaluating the battlefield situation based on visual observation and/or instrument reading, monitoring and operating various weapons systems, evading perceived or actual threats from enemy action, and the like.

To minimize the capability of the enemy to detect the aircraft and/or engage it with lethal weapons, a technique which is often resorted to is so-called nap-of-the-earth flight where the pilot utilizes the features of the battlefield terrain and ground cover to hide behind. While this technique minimizes the risk that the helicopter would be spotted or detected by enemy forces and that, as a result, it would be subjected to hostile action by the enemy, such a covert operation technique, by the same token, limits the ability of the pilot or other crew of the helicopter to observe, detect, evaluate, and take action against, potential enemy targets.

Consequently, when the helicopter is being operated in the nap-of-the-earth flight regime, it is necessary for the pilot to cause the helicopter to emerge from its covert location from time to time to assess the battlefield situation and/or take other appropriate action and then to bring the helicopter back into a hidden position as soon as such action is completed. It will be appreciated that the degree of vulnerability of the helicopter to enemy threats increases dramatically with the time of its exposure, so that it is imperative that the amount of time for which the helicopter is exposed be limited to the required minimum.

This so-called bob-up/bob-down or unmask/remask maneuver is currently often being performed in response to appropriate manipulation of the collective stick by the pilot. Thus, the heretofore customary manual performance of this maneuver requires the pilot to make the correct collective stick input without exceeding power limits and to stabilize the helicopter at the desired altitude as rapidly as possible.

Even when the helicopter uses a model-following control system with a side-arm controller, it is difficult for the pilot to make the correct magnitude and duration inputs while avoiding controller cross-axis coupling. Moreover, the performance of this maneuver manually requires a great deal of attention on the part of the pilot and is extremely difficult to accomplish at maximum permissible rates of ascent and descent. As a result, the aircraft may be exposed to threats for an excessive amount of time. In addition, a large proportion of the pilot's attention is devoted to the performance of the bob-up/bob-down maneuver, which detracts from his ability to use the aircraft sensors, to evaluate threats, or to perform other mission tasks.

Accordingly, it is a general object of the present invention to avoid the disadvantages of the prior art.

More particularly, it is an object of the present invention to provide a aircraft flight control system which does not possess the disadvantages of the known systems of this kind.

Still another object of the present invention is to develop the control system of the type here under consideration in such a manner as to automate the performance of the bob-up/bob-down maneuver to the highest degree possible.

It is yet another object of the present invention to devise a helicopter flight control system of the above type which would minimize the extent of pilot's involvement in the performance of the bob-up/bob-down maneuver and thus permit the pilot to devote more of his attention to other tasks.

A concomitant object of the present invention is to design the control system of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a control arrangement for use in conjunction with a flight control computer operating in response to various input signals including those received from a collective stick to control the flight regime of a helicopter, for causing the helicopter to perform bob-up and bob-down maneuvers. According to the present invention, this control arrangement comprises means for generating a first control signal when the helicopter is to perform a bob-up maneuver from its instantaneous altitude to a higher altitude; means for storing data descriptive of the instantaneous altitude at the time of commencement of the first control signal; ascent command means for issuing, in response to the first control signal, an ascent command signal representative of a helicopter ascent at a maximum permissible ascent rate; means for generating a second control signal when the helicopter is to perform a bob-down maneuver from the higher altitude to that stored in the storing means; descent command means for issuing, in response to the second control signal, a descent command signal representative of a helicopter descent at a maximum permissible descent rate; and means for supplying the respective one of the ascent and descent command signals as an additional input signal to the flight control computer for use in controlling the flight regime of the helicopter in accordance therewith.

BRIEF DESCRIPTION OF THE DRAWING

The present invention will be described in more detail below with reference to the accompanying drawing in which:

FIGS. 2a to 2c collectively depict a flow diagram of various functions performed in the performance of the bob-up and/or bob-down maneuver in accordance with the present invention in response to the actuation of the switch depicted in FIG. 1.

BEST MODE FOR CARRYING OUT THE INVENTION

Figure 1:
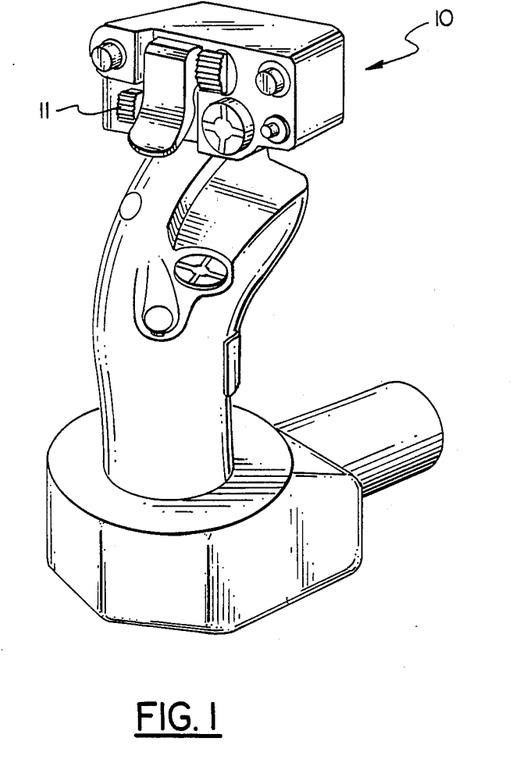
FIG. 1 is a perspective view of an example of a helicopter collective stick equipped, in accordance with the present invention, with a bob-up/bob-down switch.

Referring now to the drawing in detail, and first to FIG. 1 thereof, it may be seen that the reference numeral 10 has been used therein to identify an exemplary configuration of a so-called collective stick. The collective stick 10 is an actuating arrangement which, as is known to those versed in the helicopter manufacture and use fields, can be manipulated or moved in opposite directions and which controls the helicopter vertical movement or altitude, depending on the direction in which it is being moved by the pilot.

The movement of the collective stick 10 results in the generation, in a well-known manner, of control signals indicative of such movement. These control signals are then usually supplied to a flight control computer which issues appropriate command signals based on the aforementioned control signals and, for instance, an embedded flight regime model. The command signals are then used to control various parameters of the helicopter equipment, such as the rotor blade pitch, spatial position of the swashplate, and the like. The manner in which the manipulation of the collective stick controls the operation of the helicopter is well known and need not and will not be elaborated upon here.

The collective stick 10 carries a multitude of switches and/or other conventional devices that initiate or control various helicopter equipment functions in a manner well known to those familiar with the construction and operation of helicopters. Inasmuch as understanding the construction and operation of such devices is not needed for appreciation of the present invention, no attempt will be made here to describe them. However, in addition to such conventional devices, the collective stick 10 is also provided, in accordance with the present invention, with an additional switch 11 which is to be used for initiating or controlling the aforementioned bob-up/bob-down maneuver. It should be realized that the illustrated configuration of the collective stick 10, the particular location of the switch 11 thereon, and even the mounting of the switch 11 on the collective stick 10 in the first place, are presented here by way of an example only and that other possibilities exist and can be chosen in dependence on the particular requirements.

The switch 11, which in itself is of any known construction, is a three-position switch biased to its central "off" position and remaining in either one of its end or "on" positions only for so long as it is being held therein by the pilot. In one of its end positions, the switch 11 issues a first control signal indicative of the desire on the part of the pilot for the helicopter or similar aircraft to "bob up" from its instantaneous (presumably covert) location to a higher altitude. On the other hand, when the switch 11 is on its other end position, it issues a second control signal indicative of the desire on the part of the pilot for the helicopter to "bob down" from its instantaneous (presumably exposed) location to an altitude which it had assumed prior to the performance of the "bob up" maneuver. It will be appreciated that, while a single three-position switch has been shown in FIG. 1 of the drawing, two separate switches could be used instead, one for the "bob-up" and the other for the "bob-down".

Figure 2A:
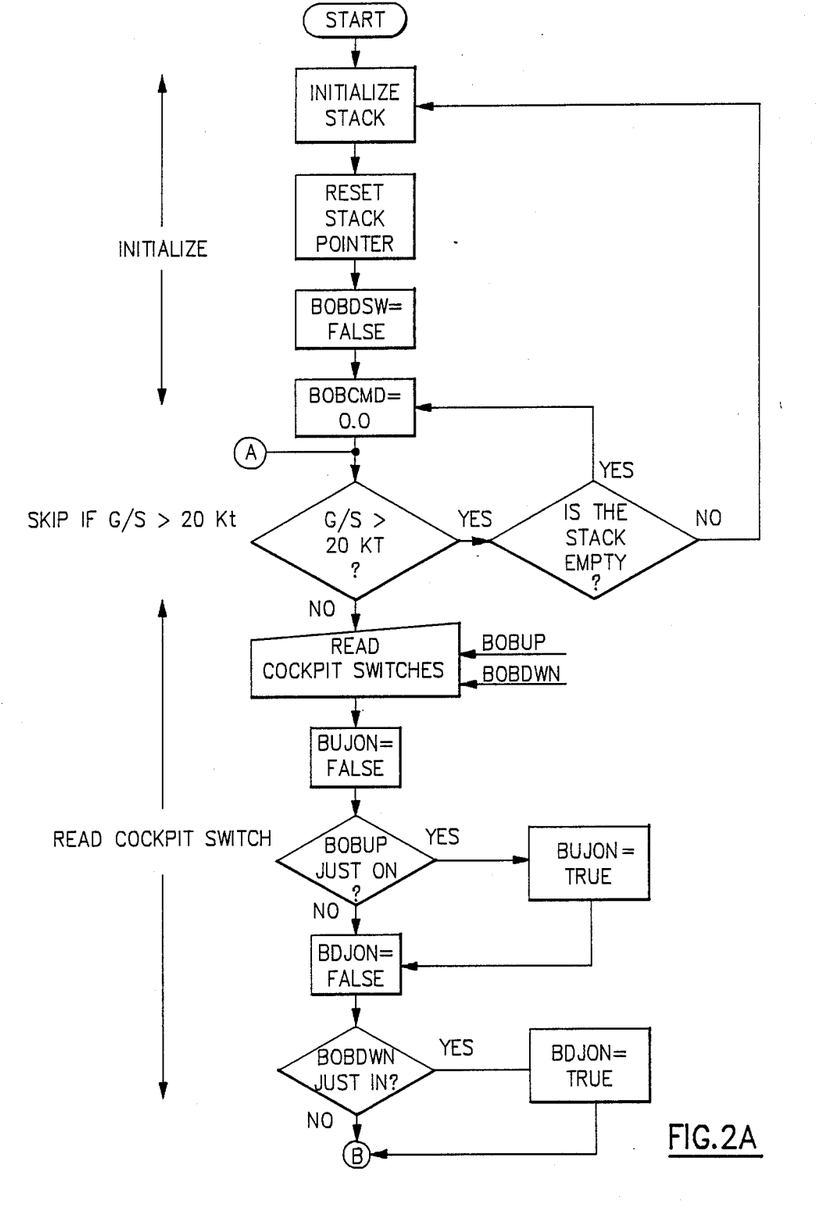
Figure 2B:
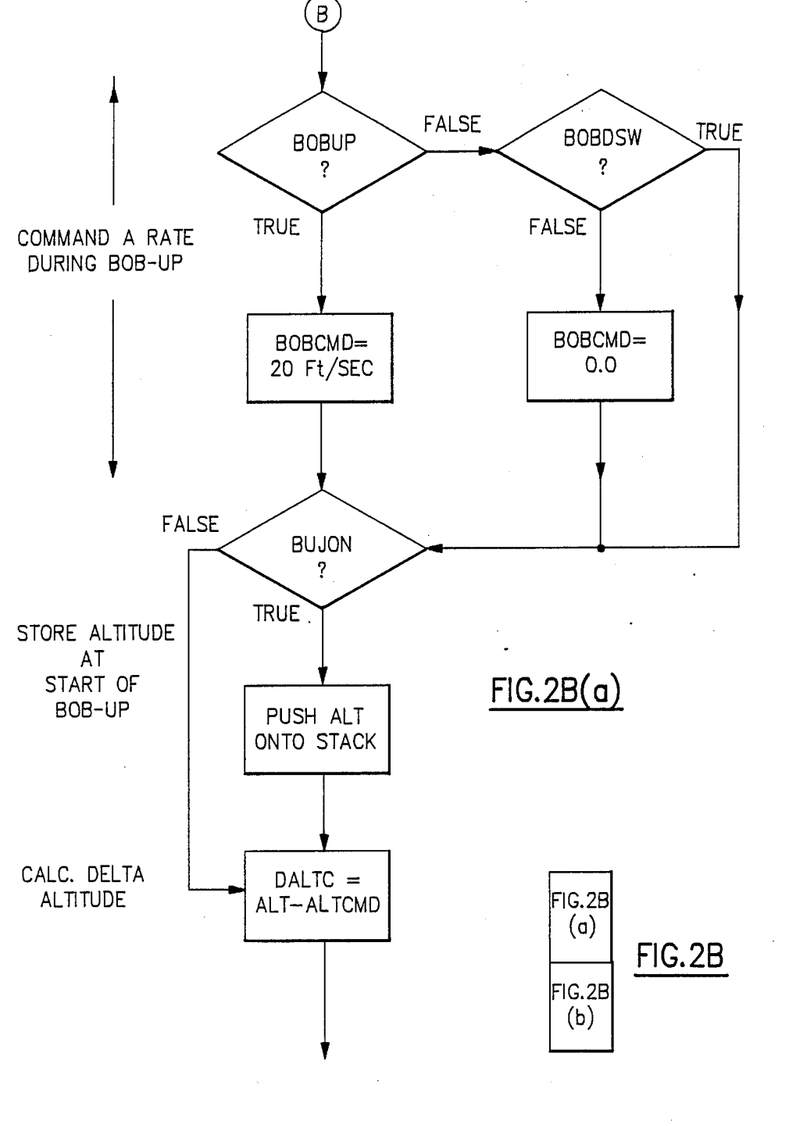
Figure 2C:
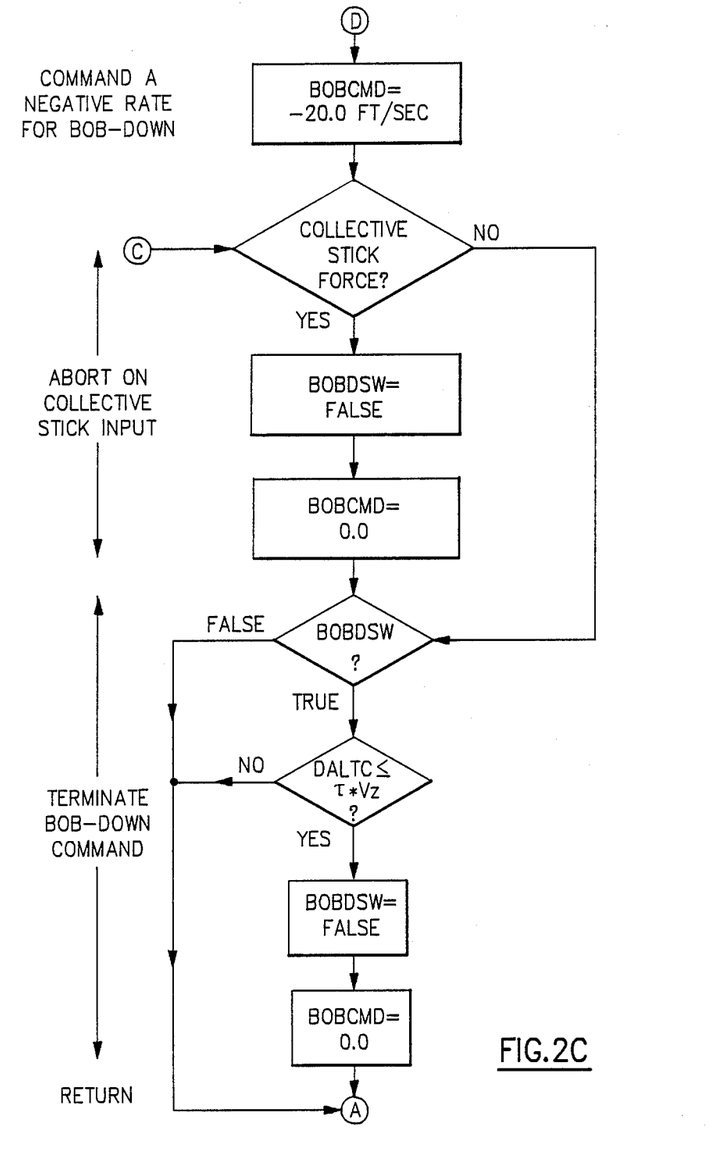

Turning now to FIGS. 2a to 2c of the drawing, it is to be mentioned first that they are to be considered in conjunction with one another and successively as depicting a succession of logic operations (comparisons, mathematical operations, true/false decisions) leading to the execution of the bob-up or bob-down altitude changes called for by the respective first and second control signals that have been mentioned previously. It is believed that, by and large, the details of the flow diagram are self-explanatory in view of the use of standard symbols to identify the various logic operations. Nevertheless, some features of the flow diagram of FIGS. 2a to 2c will now be discussed in some detail at a level of abstraction higher than the individual boxes, with reference to the legends presented at the left-hand portions of these Figures.

With reference to FIG. 2a of the drawing, it is to be mentioned first that the equipment that implements the flow diagram includes a stack of memory locations, so that it is capable of storing the information as to a plurality of (such as, for instance, three) reference or bob-down altitudes. This stack and the associated equipment is to be initialized first in a manner indicated in the upper part of FIG. 2a, where the terms BOBDSW and BOBCMD stand for bob-down switch and bob command, respectively. Then, the helicopter ground speed (G/S) is examined to determine if it exceeds a predetermined value (of 20 knots) and, if so, the automatic bobbing operation is inactivated by disregarding the aforementioned first (BOBUP) and second (BOBDWN) control signals Simultaneously, the BOBCMD is set to zero and the stack is initialized again, if necessary. If the ground speed is below the predetermined value, the BOBUP and BOBDWN signals are read and it is determined if such signals have just occurred (BUJON, BDJON), as shown in the lower part of FIG. 2a.

Continuing to the upper part of FIG. 2b, as indicated by the letter B, the next step is to command a rate during a bob-up operation. The altitude (ALT) at which the bob-up had started is then stored or pushed onto the memory location stack (pushing a previously stored ALT information, if any, down the stack) and the altitude difference between the original and the instantaneous altitude during the bob-up is calculated (DALTC). If a bob-down is then to occur, the last-stored altitude is retrieved and the bob-down switch is interrogated. If such interrogation reveals (at D) that the bob-down signal has at least momentarily commenced, the BOBCMD signal is set to the maximum permissible bob-down speed (see the top part of FIG.

2c); otherwise (as indicated at C) this setting operation is bypassed.

The collective stick input is then investigated for the existence thereon of a signal indicative of the actuation of the collective stick 10. If this interrogation reveals that the collective switch has been actuated, the automatic bobbing operation is immediately terminated since the pilot has taken over the control of the aircraft flight regime manually. Otherwise, the descent of the helicopter in the bob-down descent mode to the last-stored altitude is completed, as indicated in the lower part of FIG. 2c, and the aforedescribed process is repeated with the initiation of the stack (as indicated at A).

It may be seen from the above description that, while the investigations and actions indicated in the flow diagram of FIGS. 2a to 2c are performed in a continuous or repetitive fashion, the automatic bobbing operation is prevented from taking place if the ground speed of the helicopter exceeds a predetermined value, and it is prevented from happening or terminated if the pilot manipulates the collective stick 10, indicating the pilot's desire to return to manual operation. It should also be realized from a perusal of the flow diagram that the ascent of the aircraft to its bob-up elevation continues (at the maximum rate of ascent) for so long as the pilot holds the switch 11 in its bob-up end position, while the descent of the helicopter (at its maximum permissible rate of descent) to the last-entered altitude (from which the last bob-up was performed) is fully automated, so that the pilot merely needs to displace the switch 11 into its bob-down end position momentarily, and that a next-following displacement of the switch 11 into its bob-down position will take the aircraft down to the next lower bob-down altitude, if any, until the aircraft has reached the lowest altitude from which the bob-up (or a number of such bob-ups) has originally commenced.

The above description is deemed to be lucid enough for enabling those familiar with electronic circuitry design not only to understand the present invention but also to envision and/or construct the electronic circuitry (which may include various types of logic gates, flip-flops and similar well-known electronic components) which would perform the functions specified in FIGS. 2a to 2c of the drawing. Nevertheless, some details of such circuitry and particularly its cooperation with conventional flight control circuitry are revealed in FIG. 3 of the drawing. As shown there, the collective stick forces are processed by an arrangement 20a and subsequently by an arrangement 20b both of which are of well-known constructions so that an explanation of the details of such constructions and their operation is not needed for understanding the present invention, and none will thus be provided. Suffice it to say that a branch line 21 is branched-off from the arrangement 20a and carries signals indicative of the presence (or absence) of the collective stick force).

Figure 3:
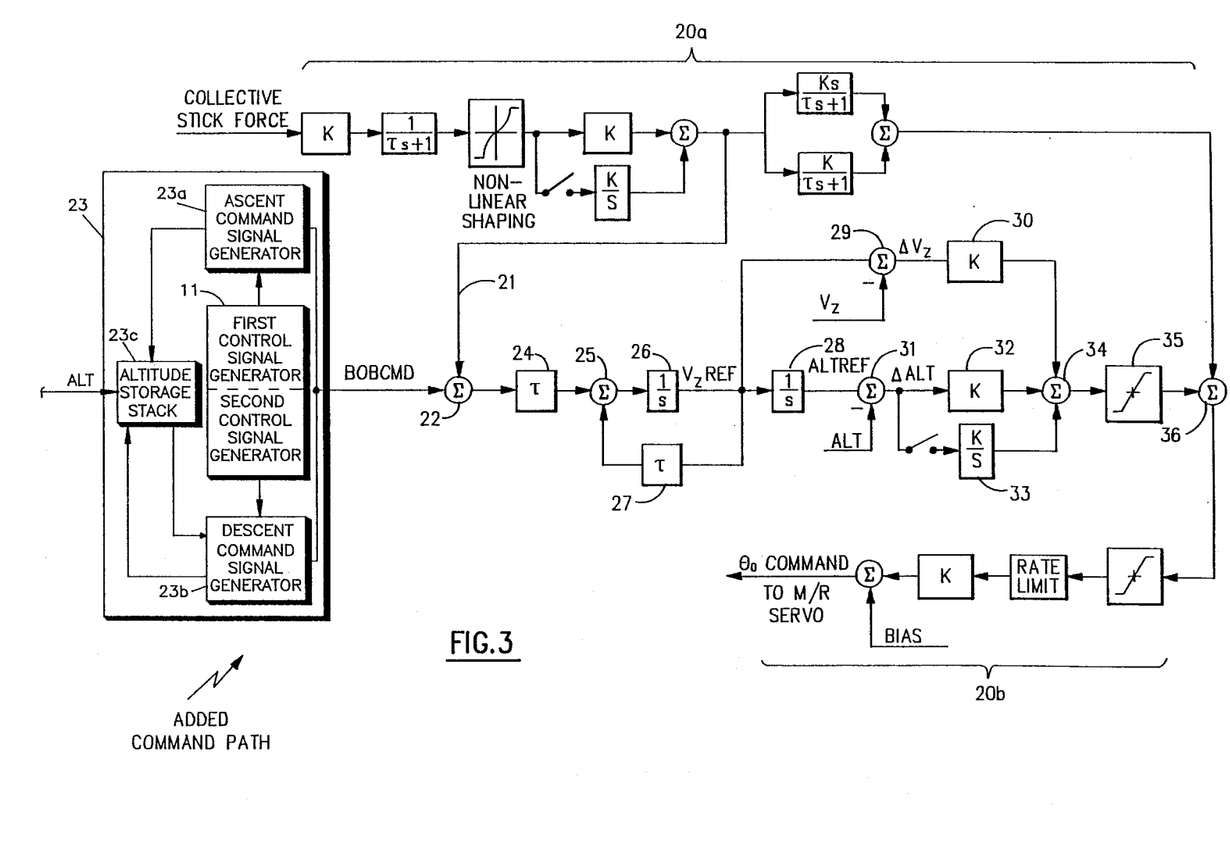
FIG. 3 is a somewhat simplified block diagram of circuitry used for the issuance of input signals for commanding the flight control computer to control the flight regime of the helicopter in accordance with such input signals, including the additional input signals presented as a result of the performance of the functions indicated in FIGS. 2a to 2c.

The branch line 21 leads to a summing junction 22 at which the above-mentioned signals are combined with signals (BOBCMD) originating at a bob-up/bob-down controller 23. The controller 23 includes, in addition to the switch 11 that generates the ascent and descent control signals, an ascent command signal generator 23a, a descent command signal generator 23b, and an altitude storage stack 23c which stores the ALT signal when commanded to do so by the ascent command signal generator 23a and supplies the thus stored signal to the descent command signal generator 23b when commanded by the latter to do so. The resulting signals, if any, appearing at the output of the junction 22 are then processed by an amplifier 24 and then reach a further summing junction 25. The output signal of the summing junction 25 is supplied to an integrating device 26 whose output signal ($v_z$REF) is fed back through an amplifier 27 to the summing junction 25. The output signal $v_z$REF of the integrating device 26 is also supplied to another integrating device 28, as well as to a subtracting device 29 where a signal ($v_z$) indicative of the instantaneous rate of climb is subtracted from this output signal $v_z$REF. The output signal ($\Delta v_z$) of the junction 29 is then amplified by an amplifier 30.

On the other hand, the output signal (ALTREF) of the integrating device 28 is supplied to another subtracting device 31 where a signal (ALT) indicative of the instantaneous altitude is subtracted therefrom. The subtraction result is supplied to an amplifier 32 and selectively to an integrating amplifier 33, from where to thus processed signals propagate to a summing junction 34 where such signals are combined with the output signal of the amplifier 30. The combination result is then fed trough a limiting device 35 to a summing junction 36 which is situated between the arrangements 20a and 20b and at which the output signal appearing at the output of the limiting device 35 is combined with the output signal of the arrangement 20a.

While the present invention has been illustrated and described as embodied in a particular construction of a control arrangement for a helicopter, it will be appreciated that the present invention is not limited to this particular example; rather, the scope of protection of the present invention is to be determined solely from the attached claims.

We claim:

1. A control apparatus, for use in conjunction with a flight control computer which controls the flight regime of a helicopter in response to various input signals including collective stick force signals received from and indicative of manipulation forces applied to a collective stick, for causing the helicopter to perform bob-up and bob-down maneuvers, comprising means for generating a first control signal when the helicopter is to perform a bob-up maneuver from its instantaneous altitude to a higher altitude;

means for storing data descriptive of said instantaneous altitude at the time of commencement of said first control signal;

ascent command means for issuing, in response to said first control signal, an ascent command signal representative of a helicopter ascent at a maximum permissible ascent rate;

means for generating a second control signal when the helicopter is to perform a bob-down maneuver from said higher altitude to that stored in said storing means;

descent command means for issuing, in response to said second control signal, a descent command signal representative of a helicopter descent at a maximum permissible descent rate; and means for supplying the respective one of said ascent and descent command signals as an additional input signal to the flight control computer for use in controlling the flight regime of the helicopter in accordance therewith.

2. The control apparatus as defined in claim 1, wherein said ascent command means is operative for issuing said ascent command signal only for the duration of said first control signal.

3. The control apparatus as defined in claim 1, wherein said descent command means is operative for issuing said descent command signal in response to the commencement of said second control signal and until the helicopter reaches said stored altitude.

4. The control apparatus as defined in claim 1, and further comprising means for inhibiting the supply of said additional input signal to the flight control computer when the ground speed of the helicopter exceeds a predetermined level.

5. The control apparatus as defined in claim 1, and further comprising means for detecting the presence of the collective stick force signals; and means for inhibiting the supply of said additional input signal to the flight control computer in response to such detection.

6. The control apparatus as defined in claim 1, wherein said storing means is operative for storing data descriptive of a succession of said instantaneous altitudes; and wherein said descent command means is operative for issuing said descent command signal in such a manner that, in response to the commencements of successive ones of said second control signals, the helicopter is commanded to descend in reverse order through said succession of instantaneous altitudes.

* * * * *